United States Patent [19]

Schmidt et al.

[11] 4,450,249

[45] May 22, 1984

[54] INTERNAL ANTISTATIC AGENTS FOR POLYCARBONATES AND FOR POLYCARBONATE FILMS

[75] Inventors: Manfred Schmidt, Krefeld; Joachim Wank, Dormagen-Hons; Eckart Reese, Dormagen; Dieter Freitag, Krefeld-Traar; Klaus Wangermann, Krefeld; Wolfgang Cohnen, Leverkusen, all of Fed. Rep. of Germany

[73] Assignee: Bayer Aktiengesellschaft, Leverkusen, Fed. Rep. of Germany

[21] Appl. No.: 409,463

[22] Filed: Aug. 19, 1982

Related U.S. Application Data

[63] Continuation of Ser. No. 172,048, Jul. 25, 1980, abandoned.

[30] Foreign Application Priority Data

Aug. 1, 1979 [DE] Fed. Rep. of Germany ....... 2931172

[51] Int. Cl.$^3$ .............................................. C08K 5/42
[52] U.S. Cl. .................................. 524/132; 524/141; 524/158; 524/161; 524/162; 524/910; 524/912
[58] Field of Search ............... 524/132, 141, 158, 161, 524/162, 910, 912

[56] References Cited

U.S. PATENT DOCUMENTS

| | | | |
|---|---|---|---|
| 3,068,215 | 12/1962 | Laakso et al. | 260/88.3 |
| 3,259,520 | 7/1966 | Borman | 260/DIG. 16 |
| 3,310,575 | 3/1967 | Spivack et al. | 525/2 |
| 3,321,435 | 5/1967 | Fritz et al. | 260/45.7 R |
| 3,341,343 | 9/1967 | Beiswanger et al. | 260/DIG. 16 |
| 3,404,122 | 10/1968 | Fritz et al. | 260/45.7 |
| 3,560,591 | 2/1971 | Tanaka et al. | 260/860 |
| 3,775,367 | 11/1973 | Nouvertné260 | 45.9 R/ |
| 3,909,490 | 9/1975 | Mark | 524/161 |
| 3,933,734 | 1/1976 | Mark et al. | 260/45.75 |

FOREIGN PATENT DOCUMENTS

| | | |
|---|---|---|
| 134234 | 2/1979 | German Democratic Rep. |
| 45-2100 | 1/1970 | Japan . |
| 53-082876 | 7/1978 | Japan . |
| 53-094364 | 8/1978 | Japan . |
| 54-0154442 | 12/1979 | Japan . |
| 1370744 | 10/1974 | United Kingdom . |
| 1522435 | 8/1978 | United Kingdom . |

OTHER PUBLICATIONS

Chemical Abstracts, vol. 72, No. 22.1, Jun. 1970, No. 112419m, (Japan 69 31,462).
Chemical Abstracts, vol. 78, No. 8.26, Feb. 1972, No. 44542t, (Japan 72, 26, 438).
Chemical Abstracts, vol. 92, No. 10, Mar. 10, 1980, No. 78208t.
Chemical Abstracts, vol. 80, No. 2, Jan. 14, 1974, No. 4573p, (Japan 72 38,544).

*Primary Examiner*—Paul R. Michl
*Attorney, Agent, or Firm*—Gene Harsh; Lawrence S. Pope; Aron Preis

[57] ABSTRACT

The present invention relates to polycarbonate articles and films characterized by their antistatic properties comprising polycarbonate resin and alkali, or alkali earth, salts of specific aromatic sulfonic acids, specific aromatic phosphonic acids or aromatic partial phosphoric acid esters.

8 Claims, No Drawings

INTERNAL ANTISTATIC AGENTS FOR POLYCARBONATES AND FOR POLYCARBONATE FILMS

This application is a continuation of application Ser. No. 172,048, filed July 25, 1980, abandoned.

BACKGROUND OF THE INVENTION

The present invention relates to polycarbonate articles and films characterized by their antistatic properties comprising polycarbonate resin and alkali, or alkali earth, salts of specific aromatic sulfonic acids, specific aromatic phosphonic acids or aromatic partial phosphoric acid esters.

DESCRIPTION OF THE PRIOR ART

It is known that films or shaped articles can be provided with an antistatic finish by subsequent treatment with an external antistatic agent, for example by brushing thereon a solution of a chemical having antistatic properties causing a reduction of the surface resistivity $R_{OA}$ of the film or of the shaped article and a decrease or a complete avoidance of electrostatic charge buildup (compare British Pat. No. 852,923 or Dutch Patent Specification No. 6,411,681).

However, such films have adequate antistatic properties for only a short time since the coating of the antistatic agent can be rapidly removed by the effects of weather and by external mechanical influences.

Another possibility of providing films or shaped articles with an antistatic finish is to apply a conductive coating of, for example, carbon black or metal. The coated parts are thereby rendered opaque and become susceptible to any external mechanical stress which can easily cause the coating to flake off or tear.

It is likewise known that the surface resistivity $R_{OA}$ of films can be reduced by admixing carbon black in amounts by weight of up to 30%. Such black-colored films have a significantly impaired pattern of mechanical properties and, at the same time as the surface resistivity $R_{OA}$ of the film is reduced, its specific volume resistivity $\rho_D$ is also reduced which means that the film can no longer be used, for example, as an electrical insulating material.

It is furthermore known that sulfonic acid salts (see German Offenlegungsschrift No. 2,648,128 and German Patent Specification No. 1,930,257 (LeA No. 12,278)) and phosphonic acid salts (compare German Offenlegungsschrift No. 2,149,311 (LeA No. 13,999)) can be used for rendering polycarbonate flameproof.

It is known from German Patent Specification 1,239,471 and U.S. Pat. No. 3,404,122 that partial phosphoric acid esters can be used for stabilizing polycarbonate.

BRIEF DESCRIPTION OF THE INVENTION

The present invention relates to the use of alkali metal salts or alkaline earth metal salts of specific monomeric or polymeric aromatic sulfonic acids, monomeric aromatic phosphonic acids or monomeric aromatic partial phosphoric acid esters in amounts of 0.01–20% by weight as additives for polycarbonate, in particular for polycarbonate film, which reduce or completely prevent the buildup of an electrostatic charge and reduce the surface resistivity $R_{OA}$ of the polycarbonate, in particular of the polycarbonate film.

The salts, which act as internal antistatic agents, cause a lowering of the surface resistivity without changing the electrical properties such as the specific volume resistivity $\rho_D$, the dielectric number $\epsilon$ or the dielectric loss factor $\tan \delta$ and without damaging the polycarbonate.

DETAILED DESCRIPTION OF THE INVENTION

It has been found, surprisingly, that polycarbonate films to which 0.01 to 20% by weight, preferably 0.05 to 10% by weight, of an alkali metal salt or alkaline earth metal salt of a monomeric aromatic sulfonic acid of the general formula (1)

$$(R)_{1-4}-A\!-\!\![(SO_3)_n M_m]_y \qquad (1)$$

in which

A denotes an aryl radical containing 1 to 4 aromatic rings,
R denotes $C_4$—$C_{20}$—alkyl, alkenyl, $C_6$—$C_{20}$— cycloalkyl or cycloalkenyl,
M denotes an alkali metal and
$m = n = 1$, or
M denotes an alkaline earth metal and
$m = 1$ and
$n = 2$, and
y denotes an integer from 1 to 4, or of an alkali metal salt or alkaline earth metal salt of a polymeric aromatic (poly)-sulfonic acid of the general formula (2)

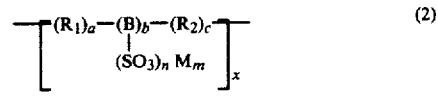
$$\left[ \begin{array}{c} (R_1)_a-(B)_b-(R_2)_c \\ | \\ (SO_3)_n M_m \end{array} \right]_x \qquad (2)$$

in which $R_1$ and $R_2$ denote independently $C_2$—$C_6$—alkylene radicals,
B denotes

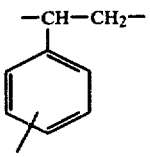

$-CH-CH_2-$

M, n and m are as defined for formula (1), a, b and c denote integers $\geq 1$ with the proviso that $b = 3$–30 and $a + b + c = 100$ and x denotes a number of a magnitude such that the polymeric salt has an average molecular weight (weight-average molecular weight) $\overline{M}_w$ of 800 to $10^6$, or of an alkali metal salt or alkaline earth metal salt of a monomeric aromatic phosphonic acid of the general formula (3)

$$(R)_{1-4}-A\!-\!\![(PO_3)M_p]_z \qquad (3)$$

in which

A and R are as defined for formula (1),
M denotes an alkali metal and
$p = 2$, or
M denotes an alkaline earth metal and
$p = 1$, and
z denotes 1 or 2, or of an alkali metal salt or alkaline earth metal salt of a monomeric partial aromatic phosphoric acid ester of the general formula (4)

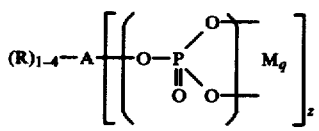

in which

A, R and z are as defined for formula (3) and
M denotes an alkali metal and
q=2, or
M denotes an alkaline earth metal and
q=1, or of an alkali metal salt or alkaline earth metal salt of a monomeric partial aromatic phosphoric acid ester of the general formula (5)

in which

A and R are as defined for formula (1) and
M denotes an alkali metal and
d=e=1, or
M denotes an alkaline earth metal and
d=1 and
e=2, has been admixed have a reduced surface resistivity $R_{OA}$, while the electrical properties of the film such as its specific volume resistivity $\rho_D$, the dielectric number $\epsilon$ or its dielectric loss factor tan $\delta$, correspond to the values of the film containing no additive. Polycarbonate films containing more than 0.05% by weight of salts of the general formulae (1) to (5) can no longer be charged electrostatically (charge measured in accordance with DIN 53 486).

The above-mentioned percentages by weight of salts of the formula (1), (2), (3), (4) or (5) added in each case relate to the total weight of polycarbonate resin and the particular weight of salt of the formula (1), (2), (3), (4) or (5) added.

There are no substantial changes in the electrical properties, in particular the antistatic properties, of the polycarbonate films provided with an antistatic finish according to the invention when these films are subjected to the effect of weather or to mechanical influences.

For example, the maximum final charge (measured in accordance with the method of DIN No. 53,486) of a solution-cast polycarbonate film which contains 0.01% by weight of a lithium salt of the general formulae (1) to (5) is reduced from about 30 kv/cm to 1.2 kv/cm.

It is no longer possible to detect an electrostatic charge in the case of a solution-cast polycarbonate film which contains, for example, 0.05 to 0.07% by weight of a lithium or calcium salt of the general formulae (1) to (5). The charge was measured in accordance with the method of DIN No. 53,486, the final Charge $E_e$ of the solution-cast polycarbonate film containing the additive being measured after rubbing this polycarbonate film fifty times with polyacrylonitrile ("Dralon") or polyamide 6 ("Perlon"), in each case in comparison with a solution-cast polycarbonate film which does not contain the additive (compare the examples of the table).

A significant lowering in the surface resistivity $R_{OA}$ can be recorded in the case of a polycarbonate film which contains, for example, a lithium or calcium salt of the general formulae (1) to (5) in an amount of >0.1% by weight. The surface resistivity can be reduced to values of about $10^7 \Omega$ by increasing the additive concentration to 10% by weight (the surface resistivity of the additive-free polycarbonate film is $10^{14}\Omega$). In this case, the initially mentioned dielectric properties of the polycarbonate film containing the additives ($\rho_D$, $\epsilon$, tan $\delta$) are only changed to a minor extent compared with a polycarbonate film which does not contain additive.

By aromatic polycarbonates in the context of this invention, there are understood, for example, homopolycarbonates and copolycarbonates based on one or more of the following bisphenols: hydroquinone, resorcinol, dihydroxydiphenyls bis-(hydroxyphenyl)-alkanes, bis-(hydroxyphenyl)-cycloalkanes, bis-(hydroxyphenyl)-sulfides, bis-(hydroxypheny)-ethers, bis-(hydroxyphenyl)-ketones, bis-(hydroxyphenyl)-sulfoxides, bis-(hydroxyphenyl)-sulfones and $\alpha,\alpha'$-bis-(hydroxyphenyl)-diisopropyl-benzenes and nuclear-alkylated and nuclear-halogenated derivatives thereof. These and other suitable aromatic dihydroxy compounds are described, for example, in U.S. Pat. Nos. 3,028,365; 2,999,835; 3,148,172; 3,275,601; 2,991,273; 3,271,367; 3,062,781; 2,970,131 and 2,999,846, in German Offenlegungsschriften 1,570,703; 2,063,050; 2,063,052; 2,211,956 and 2,211,977, in French Patent Specification 1,156,518 and in the monograph "H. Schnell Chemistry and Physics of Polycarbonates, Interscience Publishers, New York, 1964".

Preferred bisphenols are those of the formula (6)

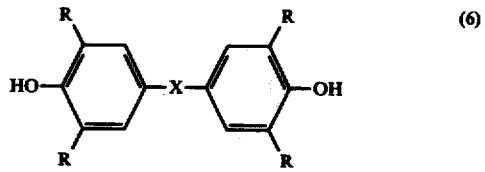

in which the symbols R are identical or different and denote H, $C_1$—$C_4$—alkyl, Cl or Br, and in which X is a bond, $C_1$—$C_8$—alkylene, $C_2$—$C_8$—alkylidene, $C_5$—$C_{15}$—cycloalkylene, $C_5$—$C_{15}$—cycloalkylidene, —$SO_2$— or

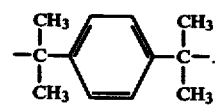

Examples of these bisphenols are: 4,4'-dihydroxydiphenyl; 2,2-bis(4-hydroxyphenyl)-propane; 2,4-bis-(4-hydroxyphenyl)-2-methylbutane; 1,1-bis-(4-hydroxyphenyl)-cyclohexane; $\alpha,\alpha'$-bis-(4-hydroxyphenyl)-p-diisopropyl-benzene; 2,2-bis-(3-methyl-4-hydroxyphenyl)-propane; 2,2-bis-(3-chloro-4-hydroxyphenyl)-propane; bis-(3,5-dimethyl-4-hydroxyphenyl)-methane; 2,2-bis-(3,5-dimethyl-4-hydroxyphenyl)-propane; bis-(3,5-dimethyl-4-hydroxyphenyl)-sulfone; 2,4-bis-(3,5-dimethyl-4-hydroxyphenyl)-2-methylbutane; 1,1-bis- (3,5-dimethyl-4-hydroxyphenyl)-cyclohexane; α,α'-bis-(3,5-dimethyl-4-hydroxyphenyl)-p-diisopropyl-benzene; 2,2-bis-(3,5-dichloro-4-hydroxyphenyl)-propane and 2,2-bis-(3,5-dibromo-4-hydroxyphenyl)-propane.

Particularly preferred bisphenols are, for example: 2,2-bis-(4-hydroxyphenyl)-propane; 2,2-bis-(3,5-dimethyl-4-hydroxyphenyl)-propane; 2,2-bis-(3,5-dichloro-4-hydroxyphenyl)-propane; 2,2-bis-(3,5-dibromo-4-hydroxyphenyl)-propane and 1,1-bis-(4-hydroxyphenyl)-cyclohexane.

Preferred aromatic polycarbonates are those which are based on one or more of the bisphenols mentioned as preferred. Particularly preferred polycarbonates are copolycarbonates based on 2,2-bis-(4-hydroxyphenyl)-propane and one of the other bisphenols mentioned as particularly preferred. Polycarbonates based on 2,2-bis-(4-hydroxyphenyl)-propane or 2,2-bis-(3,5-dimethyl-4-hydroxyphenyl)-propane alone are also particularly preferred.

The aromatic polycarbonates can be prepared by known processes, thus, for example, from bisphenols and diphenyl carbonate by the melt transesterification process and from bisphenols and phosgene by the two-phase boundary process as described in the above-mentioned literature.

The aromatic polycarbonates can also be branched by incorporating polyhydroxy compounds in small amounts, for example 0.05–2.0 mol % (relative to the bisphenols employed). Polycarbonates of this type are described, for example, in German Offenlegungsschriften Nos. 1,570,533; 1,595,762; 2,116,974 and 2,113,347, in British Patent Specification No. 1,079,821 and in U.S. Pat. No. 3,544,514. Examples of some of the polyhydroxy compounds which can be used are phloroglucinol; 4,6-dimethyl-2,4,6-tri-(4-hydroxyphenyl)-hept-2-ene; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis[4,4-bis(4-hydroxyphenyl)-cyclohexyl]-propane; 2,4-bis-(4-hydroxyphenyl-isopropyl)-phenol; 2,6-bis-(2'-hydroxy-5'-methyl-benzyl)-4-methyl-phenol; 2,4-dihydroxybenzoic acid; 2-(4-hydroxyphenyl)-2-(2,4-dihydroxyphenyl)-propane and 1,4-bis-(4',4''-dihydroxytriphenyl-methyl)-benzene.

The aromatic polycarbonates should as a rule have molecular weights $M_w$ of 10,000 to over 200,000, preferably of 20,000 to 80,000.

Suitable alkali metal salts or alkaline earth metal salts in the context of the invention are understood as those lithium, sodium, potassium, calcium, magnesium or barium salts of the general formulae (1) to (5) which, when dissolved or suspended in water, form solutions or suspensions which have a pH value of 4.5–8.5 but, in particular, a pH value of 5.5–8.0. The lithium and calcium salts of the general formulae (1) to (5) are preferred. Particularly preferred salts are monomeric aromatic sulfonic acid salts of the general formula (1.1)

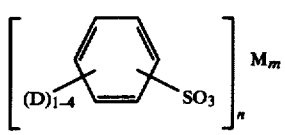

(1.1)

in which
D denotes $C_4$—$C_{20}$—alkyl or alkenyl, and
M denotes Li and
m=n=1, or
M denotes Ca and
m=1 and
n=2,
and lithium or calcium salts of sulfonated copolymers of styrene and $C_2$—$C_6$—alkenes with a styrene content of 3 to 30% by weight, as well as monomeric aromatic phosphonic acid salts of the general formula (3.1)

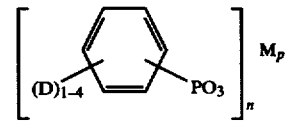

(3.1)

in which
D denotes $C_4$—$C_{20}$—alkyl or alkenyl and
M denotes Li and
p=2 and
n=1, or
M denotes Ca and
p=1=n.
Especially preferred salts are

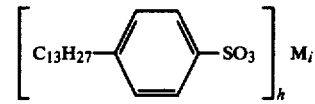

in which
M denotes Li and
h=i=1, or
M denotes Ca and
i=1 and
h=2,
and

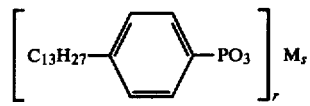

in which
M denotes Li and
s=2 and
r=1, or
M denotes Ca and
r=s=1.

Where their preparation is not known from the literature, the salts of the formulae (1) to (5) which can be used according to the invention can be prepared by neutralizing the corresponding free acids with the corresponding alkali metal hydroxides or alkaline earth metal hydroxides in a known manner, for example in $H_2O$ or $H_2O$/alcohol mixtures.

The polycarbonate films provided with an antistatic finish can be produced from a solution of the polycarbonate in methylene chloride or in a methylene chloride/chloroform mixture by the casting method, the required amount of the antistatic additive of the general formulae (1) to (5) being dissolved or suspended in the solvent for the polycarbonate and this solution or suspension being added to the polycarbonate solution. This method of producing films is described, for example, in German Auslegeschrift No. 1,274,274 and in German Offenlegungsschrift No. 2,517,032.

It is equally possible to introduce the required amount of the antistatic additive into the polycarbonate solution after the reaction stage and washing stage of the preparation of the polycarbonate and, after concentrating this solution, to process the concentrate to granules via an evaporation extruder or to an extruded film via an evaporation extruder to a sheet die.

The antistatic polycarbonate films can also be produced by the extrusion process, in which case the desired amount of the antistatic additive of the general formulae (1) to (5) is mixed into the polycarbonate melt in an extruder which has a degassing zone and is connected to a sheet die via an adaptor. After emerging from the die, the still plastic films are allowed to run onto a cooling grid, a chill-roll unit or a triple roll mill, whereupon the temperature of the polymer is reduced. The films thereby solidify and can be wound up. (See, for example, German Offenlegungsschrift No. 2,437,508.)

According to another similarly customary production process, the antistatic additive of the general formulae (1) to (5) can be mixed with a part amount of the aromatic polycarbonate to form a concentrate; this concentrate is then combined with the balance of aromatic polycarbonate in an extrusion operation and the antistatic polycarbonate films with the calculated content of antistatic additive of the general formulae (1) to (5) are obtained.

The customary sheet dies can be used for producing the extruded films according to the invention. Profile dies and the customary blowing heads are used for injection-molded polycarbonate and blow-molded polycarbonate.

The antistatic polycarbonate films can also contain other materials such as pigments, heat stabilizers, ultraviolet light stabilizers, mold release agents, glass fibers and reinforcing fillers such as, for example, mica, talc, mineral wool and dolomite (in this context, compare also German Offenlegungsschrift No. 2,721,887 (LeA No. 18,935)).

The antistatic polycarbonates according to the invention can be used in the known fields of use for polycarbonates but, in particular, in the electrical sector and the glazing sector, especially for the production of electrical insulating films or light-scattering films. They can also be used, above all, as curtains for doorways in factories in which an electrostatic discharge which could ignite inflammable materials must be avoided, and as solar shields for windows. The antistatic polycarbonates according to the invention can further be used for the production of polycarbonate films for solar screens, because it is highly important that polycarbonate films for this application should be antistatic to avoid shrinkage during manufacturing and collection of dust during usage.

The solution-cast polycarbonate films used in the Examples have a thickness of 50 $\mu$m, consist of a homopolycarbonate based on 2,2-bis-(4-hydroxyphenyl)propane with a mean weight-average molecular weight $\overline{M}_w$ of 57,000 and a relative solution viscosity $\eta_{rel}$ of 1.57 ("Makrofol 5705"), measured in a 0.5% strength solution in methylene chloride and were produced from a methylene chloride solution by the casting method.

The antistatic additives according to the invention were dissolved or suspended in methylene chloride and the solution or suspension was added to the polycarbonate solution before the casting operation.

The surface resistivity $R_{OA}$ test described in the Examples which follow was carried out in accordance with the method of DIN 53,482 and the final charge $E_e$ of the films was tested at 23° C. and at a relative atmospheric humidity of 50% in accordance with the method of DIN 53,486. Examples 1 and 8 are comparison Examples.

| Example | Additive | Amount of additive (% by weight) | Rubbing partner (50 rubbings) | Final charge $E_e$ (v/cm) | Surface resistivity $R_{OA}$ | Half-life of the discharge $t_H$ (seconds) | Specific volume resistivity ($\Omega$cm) |
|---|---|---|---|---|---|---|---|
| 1 | — | — | Polyacrylonitrile fabric | +24000 | $10^{14}$ | 3600 | $>10^{15}$ |
| 2 |  $C_{13}H_{27}$—⟨phenyl⟩—$SO_3Li$ | 0.01 | Polyacrylonitrile fabric | 1000 | $10^{14}$ | 160 | $>10^{15}$ |
| 3 | " | 0.05 | Polyacrylonitrile fabric | <100 | $10^{12}$–$10^{13}$ | 20 | $>10^{15}$ |
| 4 | " | 0.10 | Polyacrylonitrile fabric | <100 | $10^{11}$ | — | $>10^{15}$ |
| 5 | " | 0.20 | Polyacrylonitrile fabric | <100 | $10^{10}$ | — | $>10^{15}$ |
| 6 | " | 1.0 | Polyacrylonitrile fabric | <100 | $10^9$–$10^{10}$ | — | $>10^{15}$ |
| 7 | " | 10.0 | Polyacrylonitrile fabric | <100 | $10^8$ | — | $>10^{15}$ |
| 8 | — | — | Polyamide 6 fabric | +30000 | $10^{14}$ | 3600 | $>10^{15}$ |

| Example | Additive | Amount of additive (% by weight) | Rubbing partner (50 rubbings) | Final charge $E_e$ (v/cm) | Surface resistivity $R_{OA}$ | Half-life of the discharge $t_H$ (seconds) | Specific volume resistivity ($\Omega$cm) |
|---|---|---|---|---|---|---|---|
| 9 | 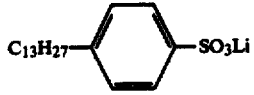 $C_{13}H_{27}$—⌬—$SO_3Li$ | 0.01 | Polyamide 6 fabric | 1200 | $10^{14}$ | 180 | $>10^{15}$ |
| 10 | " | 0.05 | Polyamide 6 fabric | 500 | $10^{12}$–$10^{13}$ | 25 | $>10^{15}$ |
| 11 | " | 0.10 | Polyamide 6 fabric | <100 | $10^{11}$ | — | $>10^{15}$ |
| 12 | " | 0.20 | Polyamide 6 fabric | <100 | $10^{10}$ | — | $>10^{15}$ |
| 13 | " | 1.0 | Polyamide 6 fabric | <100 | $10^9$–$10^{10}$ | — | $>10^{15}$ |
| 14 | " | 20.0 | Polyamide 6 fabric | <100 | $2 \cdot 10^7$ | — | $>10^{15}$ |
| 15 | 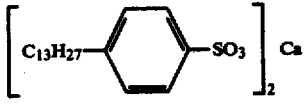 $[C_{13}H_{27}$—⌬—$SO_3]_2$ Ca | 0.1 | Polyacrylonitrile fabric | <100 | $10^{12}$ | — | $>10^{15}$ |
| 16 |  $C_{13}H_{27}$—⌬—$PO_3Ca$ | 0.1 | Polyacrylonitrile fabric | <100 | $10^{12}$ | — | $>10^{15}$ |
| 17 | 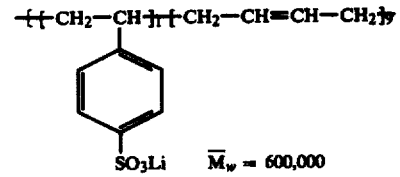 $\mathrm{-(\!\!(CH_2\!-\!CH)\!\!)_{x}\!(CH_2\!-\!CH\!=\!CH\!-\!CH_2)_{y}\!\!-}$ with pendant phenyl-$SO_3Li$, $\overline{M}_w = 600{,}000$ | 0.1 | Polyacrylonitrile fabric | <100 | $10^{12}$ | — | $>10^{15}$ |
| 18 | 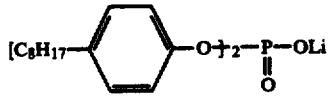 $[C_8H_{17}$—⌬—$O\!\!-\!\!]_2\!\!-\!\!P(=\!O)\!-\!OLi$ | 0.1 | Polyacrylonitrile fabric | <100 | $10^{12}$ | — | $>10^{15}$ |

What is claimed is:

1. A polycarbonate composition characterized by its antistatic properties consisting of a polycarbonate resin and a member selected from a group consisting of alkali metal salts or alkaline earth metal salts of (i) the monomeric aromatic sulfonic acid of the general formula (I)

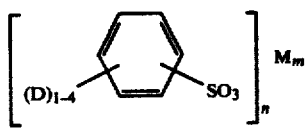

in which
D denotes $C_4$–$C_{20}$-alkyl or alkenyl, and
M denotes Li and
m=n=1, or
M denotes Ca and
m=1 and
n=2, (ii) the polymeric aromatic (poly-)sulfonic acid of the general formula (II)

$$\mathrm{-\!\!\!+\!\!(R_1)_a\!-\!(B_b)\!-\!(R_2)_c\!\!+\!\!\!_x^-} \atop {(SO_3)_n\ M_m} \qquad (II)$$

wherein
$R_1$ and $R_2$ independently denote a $C_2$–$C_6$-alkylene radical,
B denotes

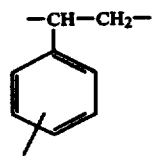

—CH—CH$_2$—
  |
  ⌬

M denotes an alkali metal and m=n=1 or
M denotes an alkaline earth metal in which case M=1 and n=2; a, b and c denote integers equal to or greater than 1 with the proviso that b=3 to 30 and a+b+c=100 and x denotes a number such that the polymeric salt has an average molecular weight (weight-average molecular weight) of 800 to $10^6$;

(iii) the monomeric aromatic phosphonic acid of the general formula (III)

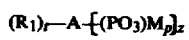  (III)

wherein

A denotes an aryl radical containing 1–4 aromatic rings, $R_1$ denotes $C_4$–$C_{20}$-alkyl, alkenyl, $C_6$–$C_{20}$-cycloalkyl or cycloalkenyl, t is an integer of from 1–4, M denotes an alkali metal and p=2, or M denotes an alkaline earth metal, in which case, p=1 and z denotes 1 or 2;

(iv) the monomeric partial aromatic phosphoric acid ester of the general formula (IV)

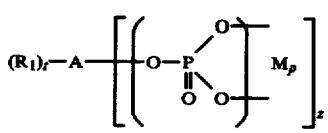  (IV)

wherein

A, $R_1$, t, M, p and z are as defined for formula (III);

(V) the monomeric partial aromatic phosphoric acid ester of the general formula (V)

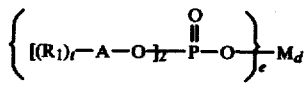  (V)

wherein

A, $R_1$ and t are as defined for formula (III) and

M denotes an alkali metal and d=e=1 or

M denotes an alkaline earth metal, in which case, d=1 and e=2.

2. The polycarbonate compositions of claim 1 wherein said member comprises between 0.01 and 20% of the weight of said composition.

3. The polycarbonate compositions of claim 1 wherein said member comprises between 0.05 and 10% of the weight of said composition.

4. The polycarbonate composition of claim 2 or claim 3 wherein said group consists of sodium, potassium, lithium, magnesium, calcium and barium salts of said formula (II) through said formula (V).

5. A polycarbonate composition characterized by its antistatic properties comprising a polycarbonate resin and between 0.01 and 20%, relative to the weight of the composition, lithium tridecylbenzenesulfonate.

6. A polycarbonate composition of claim 5 wherein said lithium tridecylbenzenesulfonate comprises between 0.05 and 10% relative to the weight of the composition.

7. A curtain suited for use in explosive environments by being substantially free of electrostatic charges buildup comprising the polycarbonate composition of claim 1.

8. A solar sreen for use as solar shields on windowpanes comprising the polycarbonate composition of claim 1.

* * * * *